(12) United States Patent
Ali (10) Patent No.: US 8,885,497 B2
(45) Date of Patent: *Nov. 11, 2014

(54) CONGESTION AVOIDANCE FOR LINK CAPACITY ADJUSTMENT SCHEME (LCAS)

(75) Inventor: Sayyid S. Ali, Schwenksville, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/913,821

(22) Filed: Oct. 28, 2010

(65) Prior Publication Data

US 2011/0038260 A1  Feb. 17, 2011

Related U.S. Application Data

(63) Continuation of application No. 11/612,985, filed on Dec. 19, 2006, now Pat. No. 7,864,803.

(51) Int. Cl.
*H04L 12/26* (2006.01)
*H04L 12/801* (2013.01)
*H04L 12/833* (2013.01)
*H04L 12/923* (2013.01)
*H04L 12/853* (2013.01)
*H04L 12/24* (2006.01)
*H04L 12/54* (2013.01)
*H04J 3/16* (2006.01)

(52) U.S. Cl.
CPC ........... *H04L 47/10* (2013.01); *H04L 47/35* (2013.01); *H04L 47/2458* (2013.01); *H04L 47/12* (2013.01); *H04L 47/762* (2013.01); *H04L 47/2416* (2013.01); *H04L 47/29* (2013.01); *H04J 3/1617* (2013.01); *H04L 41/0816* (2013.01); *H04L 12/5695* (2013.01); *Y10S 370/916* (2013.01)
USPC ............ 370/252; 370/462; 370/463; 370/916

(58) Field of Classification Search
CPC ................................. H04J 2203/0001
See application file for complete search history.

(56) References Cited

U.S. PATENT DOCUMENTS

| 5,566,175 | A | 10/1996 | Davis |
| 7,864,803 | B2 * | 1/2011 | Ali .............................. 370/468 |
| 2002/0021678 | A1 | 2/2002 | Heatwole et al. |
| 2002/0156914 | A1 * | 10/2002 | Lo et al. ......................... 709/238 |
| 2003/0007453 | A1 | 1/2003 | Ogier et al. |
| 2003/0081626 | A1 * | 5/2003 | Naor et al. .................... 370/431 |
| 2003/0206548 | A1 * | 11/2003 | Bannai et al. ................. 370/389 |

(Continued)

FOREIGN PATENT DOCUMENTS

| WO | 2005/064983 | 7/2005 |
| WO | 2006/032608 | 3/2006 |
| WO | 2007/045448 | 4/2007 |

OTHER PUBLICATIONS

ITU-T G.7042/Y.1305, "Link capacity adjustment scheme (LCAS) for virtual concatenated signals", Feb. 2004, pp. 1-32.*

(Continued)

*Primary Examiner* — Omar Ghowrwal (57) ABSTRACT

A device determines a high watermark threshold for a subrate service, compares a traffic demand to the high watermark threshold, and adds a temporary bandwidth to an original bandwidth available to the subrate service if the traffic demand is greater than or equal to the high watermark threshold.

20 Claims, 6 Drawing Sheets

(56) References Cited

U.S. PATENT DOCUMENTS

| | | |
|---|---|---|
| 2004/0033806 A1 | 2/2004 | Daniel et al. |
| 2004/0136373 A1* | 7/2004 | Bareis ............................ 370/392 |
| 2005/0073952 A1 | 4/2005 | Champlin et al. |
| 2005/0073955 A1 | 4/2005 | MacLean et al. |
| 2005/0147409 A1* | 7/2005 | Colven et al. ...................... 398/5 |
| 2006/0013133 A1* | 1/2006 | Peng et al. .................... 370/230 |
| 2006/0239188 A1 | 10/2006 | Weiss et al. |
| 2010/0254709 A1* | 10/2010 | Narvaez et al. ................. 398/98 |

OTHER PUBLICATIONS

ITU-T G.707, "Network node interface for the synchronous digital hierarchy (SDH)", Mar. 1996, pp. 1-139.*

ITU-T G.0811.1/Y.1307.1, "Ethernet private line service", Aug. 2004, pp. 1-28.*

\* cited by examiner

CONGESTION AVOIDANCE FOR LINK CAPACITY ADJUSTMENT SCHEME (LCAS)

RELATED APPLICATION

This application is a continuation of U.S. patent application Ser. No. 11/612,985, filed Dec. 19, 2006, the disclosure of which is incorporated herein by reference.

BACKGROUND INFORMATION

Ethernet Private Line (EPL) services may be offered today using Synchronous Optical Network (SONET) multiplexers, and many of the offered EPL services may be subrate services. A subrate service may be a service where a customer's user network interface (UNI) bandwidth is greater than a network bandwidth. For example, a customer may connect a local area network (LAN) Ethernet switch to a SONET multiplexer using a gigabit Ethernet interface which has a bandwidth of, e.g., "1000" Megabits per second (Mbps). However, the customer may subscribe for a network service of only, e.g., "150" Mbps. Such a scenario may be considered a subrate service because the customer's interface bandwidth (e.g., "1000" Mbps) exceeds a network service rate (e.g., "150" Mbps). Such a large discrepancy in speed between the customer interface and the network provider's service rate can result in traffic congestion during times of high traffic or traffic bursts.

Currently, the customer network interfaces (e.g., Ethernet switches) and the network provider interfaces (e.g., SONET multiplexers) used to provide EPL services do not support advanced traffic quality of service (QoS) mechanisms that prevent congestion during traffic bursts. Congestion may lead to dropped packets and retransmissions which may increase application latency and may lower the effective bandwidth of a link. Large traffic bursts that may exceed available bandwidth and lead to congestion may typically be intermittent and last for a short duration of time.

SONET multiplexers that may be used for EPL may support a Link Capacity Adjustment Scheme (LCAS). LCAS is a method that dynamically increases or decreases bandwidth of a network, and is specified in International Telecommunication Union (ITU) G.7042. LCAS may provide bandwidth on demand based primarily on time of day. The current features of LCAS work well if the customer knows exactly when the extra bandwidth may be required (e.g., over night to conduct a data backup operation). However, the timing of traffic bursts is unpredictable, and the current LCAS features fail to eliminate congestion during such traffic bursts.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may enhance current LCAS features to provide a temporary increase in bandwidth based on real-time traffic demands or rates. For example, in one implementation, traffic demand may be monitored and compared to high and low watermark thresholds. If the traffic demand is greater than or equal to the high watermark threshold, the bandwidth may be temporarily increased. If the traffic demand is less than or equal to the low watermark threshold, the temporary increase in bandwidth may be removed. By providing temporary bandwidth based on real-time traffic demands, traffic bursts may be accommodated, which may eliminate or substantially eliminate congestion on subrate services (e.g., subrate Ethernet services) and enable consistent performance for a customer. A customer may thus purchase bandwidth that fits the majority of their requirements without having to oversubscribe a network to account for occasional traffic bursts.

Figure 1:
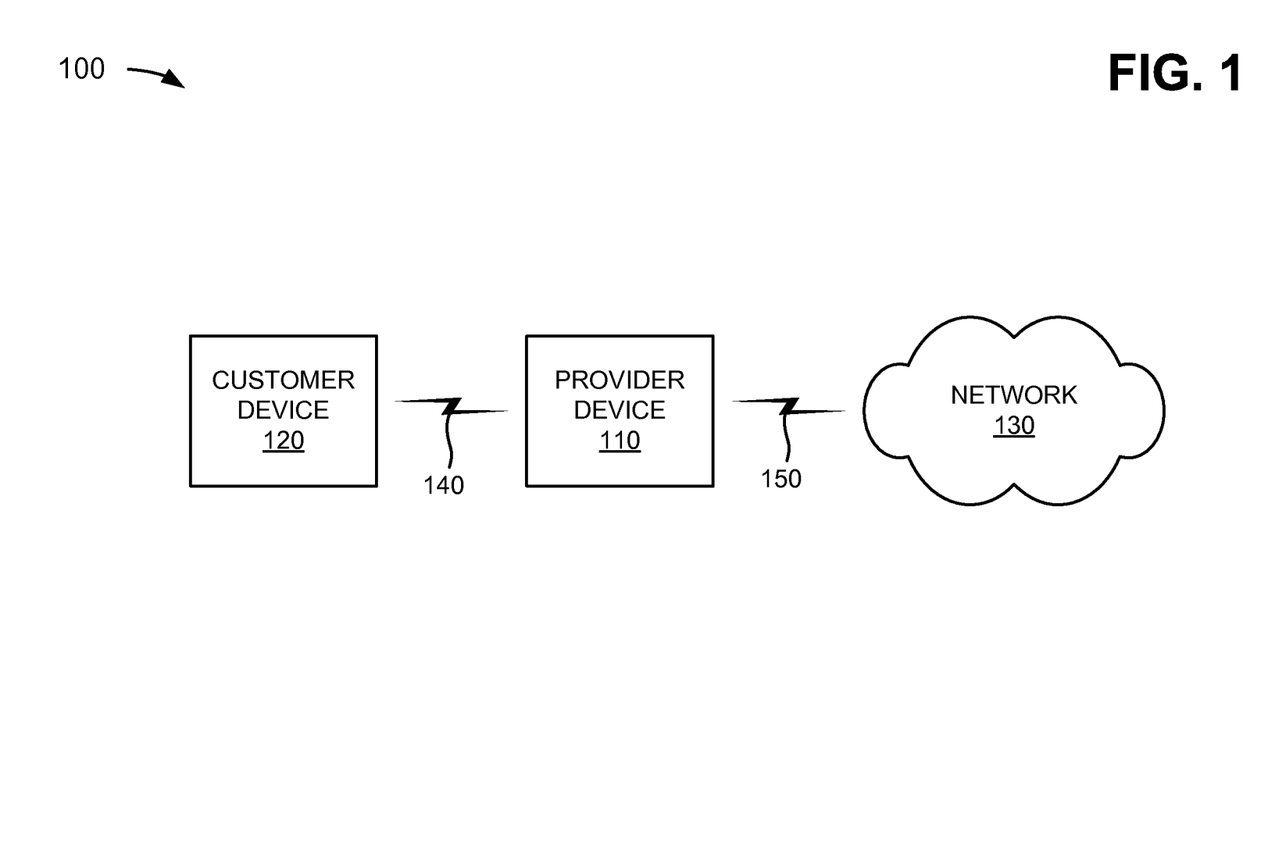
FIG. 1 depicts an exemplary network in which systems and methods described herein may be implemented.

FIG. 1 is a diagram of an exemplary network 100 in which systems and methods described herein may be implemented. Network 100 may include a provider device 110 that interconnects a network 130 to a customer device 120. Network 100 may also include other components, devices, etc. (not shown in FIG. 1). Network 130 may include a local area network (LAN), a wide area network (WAN), a metropolitan area network (MAN), a telephone network, such as the Public Switched Telephone Network (PSTN), an intranet, the Internet, or a combination of networks.

Provider device 110 and customer device 120 may connect to network 130 via connections or links 140 and 150. Links 140 and 150 may include a path that permits communication among devices, such as wired, wireless, and/or optical connections, input ports, output ports, etc. For example, network 100 may provide EPL subrate services, and link 150 may provide a connection having a bandwidth which is a subrate (e.g., "600" Mbps) of a rate provided by link 140 (e.g., Ethernet "1000" Mbps). One provider device 110 and one customer device 120 have been illustrated as connected to network 130 for simplicity. In practice, there may be more or fewer provider devices and customer devices. Also, in some instances, a provider device may perform one or more functions of a customer device and/or a customer device may perform one or more functions of a provider device.

Provider device 110 may include a device, such as a personal computer, a laptop, a multiplexer, a router, a switch, a network interface card (NIC), a hub, a bridge, etc., or another type of computation or communication device, a thread or process running on one of these devices, and/or an object executable by one of these devices. In one implementation, for example, provider device 110 may include a SONET multiplexer capable of providing Ethernet services, EPL services, subrate Ethernet services, etc. to customer device 120.

In another implementation, provider device 110 may include a SONET multiplexer that may support virtual concatenation (VCAT). VCAT may bond the SONET bandwidth increments into a single circuit. There may be two bandwidth increments in SONET, synchronous transport signal (STS-1) (i.e., the basic bandwidth unit for SONET) and virtual tributary (VT1.5). A STS-1 may provide a bandwidth of approximately "50" Mbps, and a VT1.5 may provide a bandwidth of approximately "1.5" Mbps. Provider device 110 may implement a high-order VCAT which may bond STS-1s together, and/or may implement a low-order VCAT which may bond VT1.5s together. For example, a customer (e.g., customer device 120) may order an EPL circuit that may not be a standard Ethernet rate of "10," "100," "1000" Mbps or "10"

gigabits per second (Gbps) (e.g., the customer may order a "600" Mbps EPL circuit). The ordered EPL circuit may be provided within provider device 110 (e.g., with "12" STS-1s). Additional details of provider device 110 are provided below in connection with FIG. 3.

Customer device 120 may include a device, such as a personal computer, a laptop, a multiplexer, a router, a switch, a network interface card (NIC), a hub, a bridge, etc., or another type of computation or communication device, a thread or process running on one of these devices, and/or an object executable by one of these devices. In one implementation, for example, customer device 120 may include an Ethernet interface or switch having a bandwidth (e.g., "1000" Mbps) that exceeds a network service rate of provider device 110 (e.g., a network service rate of "150" Mbps).

Although FIG. 1 shows exemplary components of network 100, in other implementations, network 100 may contain fewer or additional components that may provide a temporary increase in bandwidth based on real-time traffic demands. In still other implementations, one or more components of network 100 may perform the tasks performed by other components of network 100.

Although implementations are described below in the context of a network that supports devices capable of providing EPL services, in other implementations, equivalent or analogous communication protocols and/or types of transport networks (e.g., asynchronous transfer mode (ATM), frame relay, etc.) may be used. Furthermore, the system and method described herein may be used for any device that supports LCAS.

Figure 2:
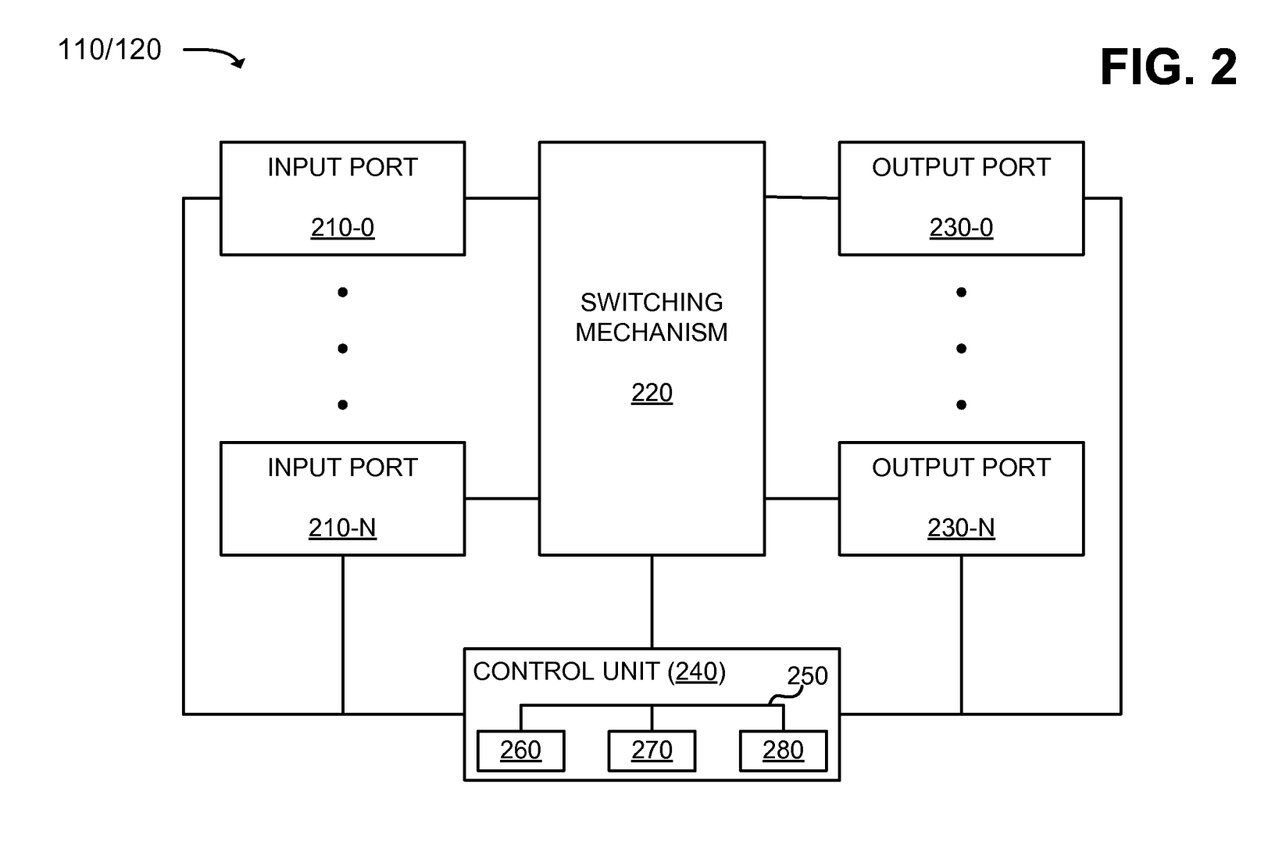
FIG. 2 depicts an exemplary device configured to communicate via the exemplary network of FIG. 1.

FIG. 2 is an exemplary diagram of a device that may correspond to one of provider device 110 or customer device 120 of FIG. 1. The device may include input ports 210-0, . . . , 210-N (collectively referred to as "input ports 210"), a switching mechanism 220, output ports 230-0, . . . , 230-N (collectively referred to as "output ports 230"), and a control unit 240. Input ports 210 may be the point of attachment for a physical link (e.g., links 140 and 150) (not shown) and may be the point of entry for incoming traffic. Switching mechanism 220 may interconnect input ports 210 with output ports 230. Output ports 230 may store traffic and may schedule traffic for service on an output link (e.g., links 140 and 150) (not shown). Control unit 240 may use routing protocols and one or more forwarding tables for forwarding traffic.

Input ports 210 may carry out data link layer encapsulation and decapsulation. Input ports 210 may look up destination addresses of incoming traffic in a forwarding table to determine destination ports (i.e., route lookup). In order to provide quality of service (QoS) guarantees, input ports 210 may classify traffic into predefined service classes. Input ports 210 may run data link-level protocols or network-level protocols. In other implementations, input ports 210 may send (e.g., may be an exit point) and/or receive (e.g., may be an entry point) traffic.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming traffic may be stored in a shared memory and pointers to traffic may be switched.

Output ports 230 may store traffic before it is transmitted on an output link (e.g., links 140 and 150). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) traffic.

Control unit 240 may interconnect with input ports 210, switching mechanism 220, and output ports 230. Control unit 240 may compute a forwarding table, implement routing protocols, and/or run software to configure and manage provider device 110 and/or customer device 120. In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Provider device 110 and/or customer device 120 may perform certain operations, as described in detail below. Provider device 110 and/or customer device 120 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of provider device 110 and/or customer device 120, in other implementations, provider device 110 and/or customer device 120 may contain fewer or additional components. In still other implementations, one or more components of provider device 110 and/or customer device 120 may perform the tasks performed by other components of provider device 110 and/or customer device 120.

Figure 3:
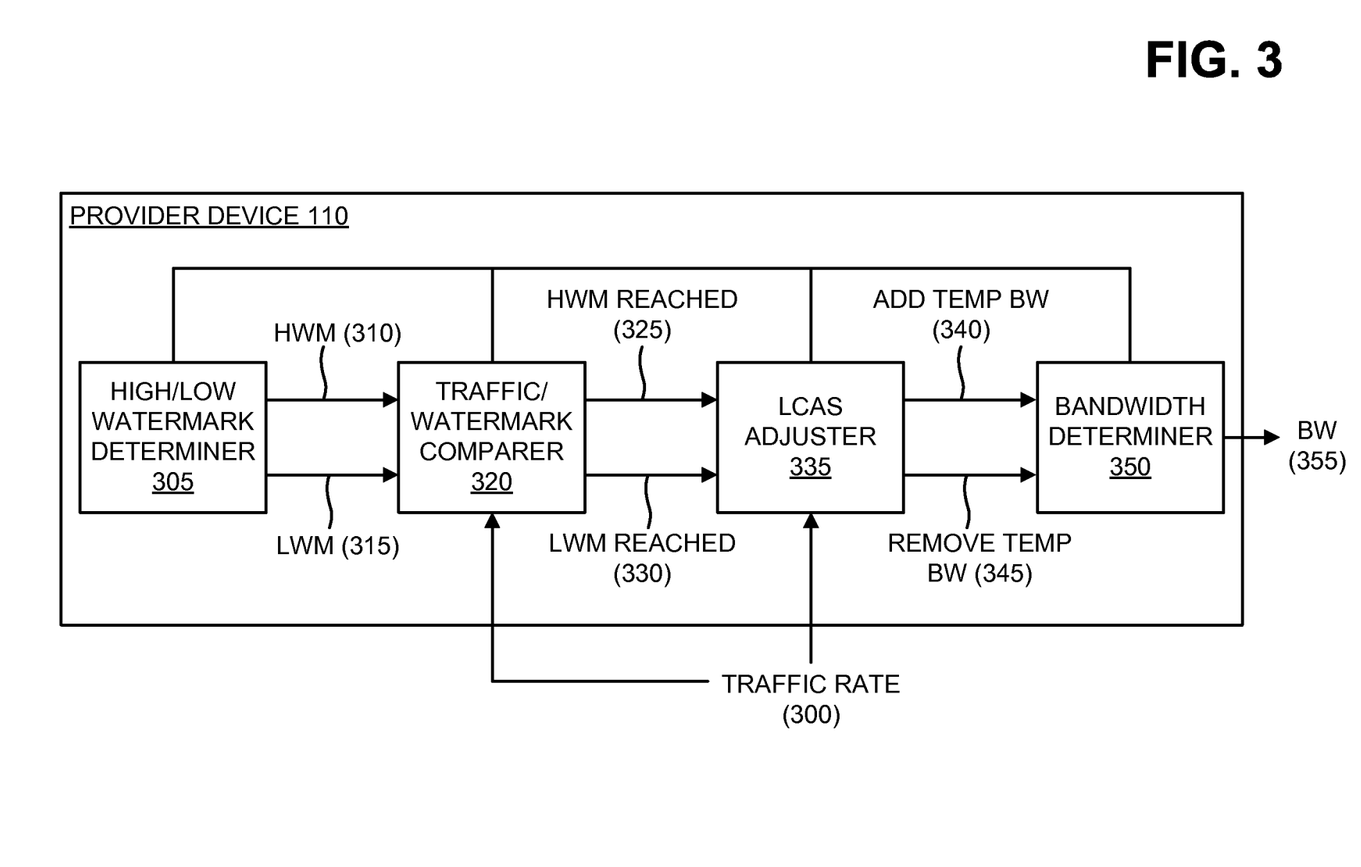
FIG. 3 is an exemplary functional diagram of a provider device of the exemplary network shown in FIG. 1.

FIG. 3 is an exemplary functional diagram of provider device 110. Provider device 110 may have a variety of components. For example, as shown in FIG. 3, provider device 110 may include a high/low watermark determiner 305, a traffic/watermark comparer 320, a LCAS adjuster 335, and a bandwidth determiner 350. Generally, provider device 110 may permit addition of temporary bandwidth for use by customer device 120 based on real-time traffic demands to prevent congestion during traffic bursts, and may remove the temporary bandwidth if the traffic burst has passed.

The decision process for adding and/or removing temporary bandwidth may be based on two parameters—a high watermark (HWM) threshold and a low watermark (LWM) threshold. HWM threshold may provide an indication that a traffic burst is imminent and therefore more bandwidth may be needed. LWM threshold may provide an indication that a traffic burst is ending or is about to end, and therefore temporary bandwidth may be removed. High/low watermark determiner 305 may permit input of a predetermined (e.g., user-defined) HWM threshold 310 and a predetermined LWM threshold 315 based on, e.g., a specific traffic rate or a percentage of an existing rate provided to customer device 120. For example, assuming customer device 120 subscribes to a "600" Mbps EPL subrate service, HWM threshold 310 may be set to ninety-five percent (95%) of the subrate service bandwidth or "570" Mbps. LWM threshold 315 may be set to eighty-five percent (85%) of the subrate service bandwidth or "510" Mbps. High/low watermark determiner 305 may provide HWM threshold 310 and LWM threshold 315 to traffic/watermark comparer 320.

Traffic/watermark comparer 320 may receive a traffic rate or demand 300, HWM threshold 310, and LWM threshold 315. Traffic/watermark comparer 320 may compare traffic rate 300 to HWM threshold 310 and LWM threshold 315. If traffic rate 300 is greater than or equal to HWM threshold 310, traffic/watermark comparer 320 may provide to LCAS adjuster 335 a signal 325 indicating that HWM threshold 310 has been reached. If traffic rate 300 is less than or equal to LWM threshold 310, traffic/watermark comparer 320 may provide to LCAS adjuster 335 a signal 330 indicating that LWM threshold 310 has been reached.

LCAS adjuster 335 may receive traffic rate 300 and signals 325 or 330 from traffic/watermark determiner 320. If LCAS adjuster 335 receives signal 325 indicating that HWM threshold 310 has been reached, LCAS adjuster 335 may add temporary bandwidth 340 based on traffic rate 300 and the original subrate service bandwidth. If LCAS adjuster 335 receives signal 330 indicating that LWM threshold 315 has been reached, LCAS adjuster 335 may remove temporary bandwidth 345.

Bandwidth determiner 350 may receive either add temporary bandwidth 340 or remove temporary bandwidth 345 from LCAS adjuster 335, and may provide bandwidth 355 capable of accommodating traffic rate 300. If bandwidth determiner 350 receives add temporary bandwidth 340, bandwidth determiner 350 may provide bandwidth 355 that includes the original subrate service bandwidth and the temporary bandwidth. If bandwidth determiner 350 receives remove temporary bandwidth 345, bandwidth determiner 350 may provide bandwidth 355 that includes the original subrate service bandwidth.

In one exemplary implementation, it may be assumed that HWM threshold 310 is "570" Mbps, and LWM threshold 315 is "510" Mbps. If traffic rate 300 reaches "570" Mbps, i.e., HWM threshold 310, LCAS adjuster 335 may add a temporary STS-1 or an additional "50" Mbps of bandwidth to the original bandwidth, which may be assumed to be "600" Mbps. The bandwidth provided to, e.g., customer device 120, may now be "650" Mbps. The increased bandwidth may prevent the traffic burst from oversubscribing the network bandwidth and may prevent congestion. The traffic burst may eventually end and traffic rate 300 may start to decrease. If traffic rate 300 declines to "510" Mbps, i.e., LWM threshold 315, LCAS adjuster 335 may remove the temporary STS-1 and the bandwidth may return to "600" Mbps. This process may repeat itself each time a traffic burst is encountered.

Although FIG. 3 shows exemplary components of provider device 110, in other implementations, provider device 110 may contain fewer or additional components. In still other implementations, one or more components of provider device 110 may perform the tasks performed by other components of provider device 110. Furthermore, although the exemplary implementation above describes adding a single temporary STS-1, any number of temporary STS-1s may be added depending upon the traffic burst and the available network bandwidth within provider device 110. In another implementation, the addition of temporary bandwidth may be applied across all or some of multiple customer devices 120 (e.g., a "150" Mbps, "300" Mbps, and/or "600" Mbps customer devices).

In still another implementation, provider device 110 may determine if multiple customer devices 120 are present, and may prioritize and/or set a policy determining which of the multiple customer devices 120 may receive additional temporary bandwidth during traffic bursts. For example, if two STS-1s are available as temporary bandwidth, a first customer device 120 may have priority over second and third customer devices 120, e.g., because the first customer device 120 carries data center traffic. The first customer device 120 may have access to one additional STS-1, while the other customer devices 120 may not access this STS-1. However, the other customer devices 120 may share the remaining STS-1 on a first-come first-serve basis (e.g., which ever of the second or third customer devices 120 experiences a traffic burst first would receive the additional temporary bandwidth from the remaining STS-1) or may share the remaining STS-1 using other techniques.

Figure 4:
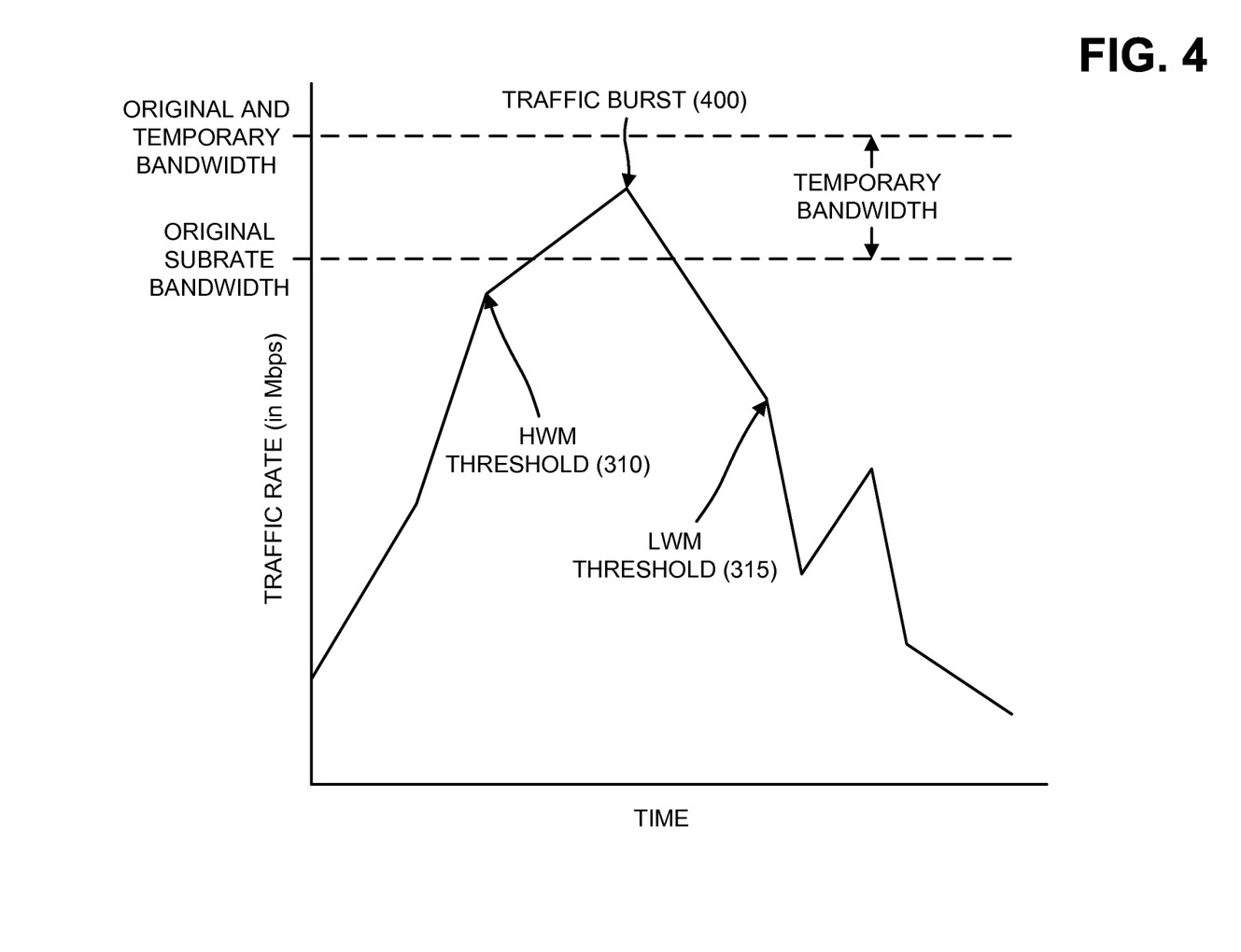
FIG. 4 is an exemplary graph of a traffic burst and how the provider device of FIG. 3 may handle the traffic burst.

FIG. 4 is an exemplary graph of a traffic burst 400 and how provider device 110 may handle traffic burst 400. As shown, the traffic rate may increase with time until HWM threshold 310 is achieved. Before HWM threshold 310 is reached, provider device 110 may provide an original subrate bandwidth (e.g., "600" Mbps). If the traffic rate is greater than or equal to HWM threshold 310, provider device 110 may increase the original subrate bandwidth with a temporary bandwidth (e.g., "50" Mbps) since traffic burst 400 may be imminent. Thus, provider device 110 may provide a bandwidth (e.g., "650" Mbps) equal to the sum of the original subrate bandwidth ("600" Mbps) and the temporary bandwidth ("50" Mbps). After traffic burst 400 occurs, the traffic rate may decrease with time until LWM threshold 315 is achieved. At this point, provider device 110 may remove the temporary bandwidth and provide only the original subrate bandwidth ("600" Mbps).

In other implementations, more than one HWM threshold 310 and/or more than one LWM threshold 315 may be provided. In these implementations, each HWM threshold 310 may trigger the addition of a single temporary bandwidth (e.g., "50" Mbps) and each LWM threshold 315 may trigger the removal of a single temporary bandwidth (e.g., "50" Mbps). Thus, for example, if the traffic rate equals or exceeds a first HWM threshold, a first amount of temporary bandwidth may be added to the original subrate bandwidth to create a new bandwidth. If the traffic rate then goes on to equal or exceed a second HWM threshold, a second amount of temporary bandwidth may be added to the new bandwidth. The second amount of temporary bandwidth may be the same as or different than the first amount of temporary bandwidth. The second amount of temporary bandwidth and the first amount of temporary bandwidth may be removed in a similar manner based on the traffic rate reaching first and second LWM thresholds.

Figure 5:
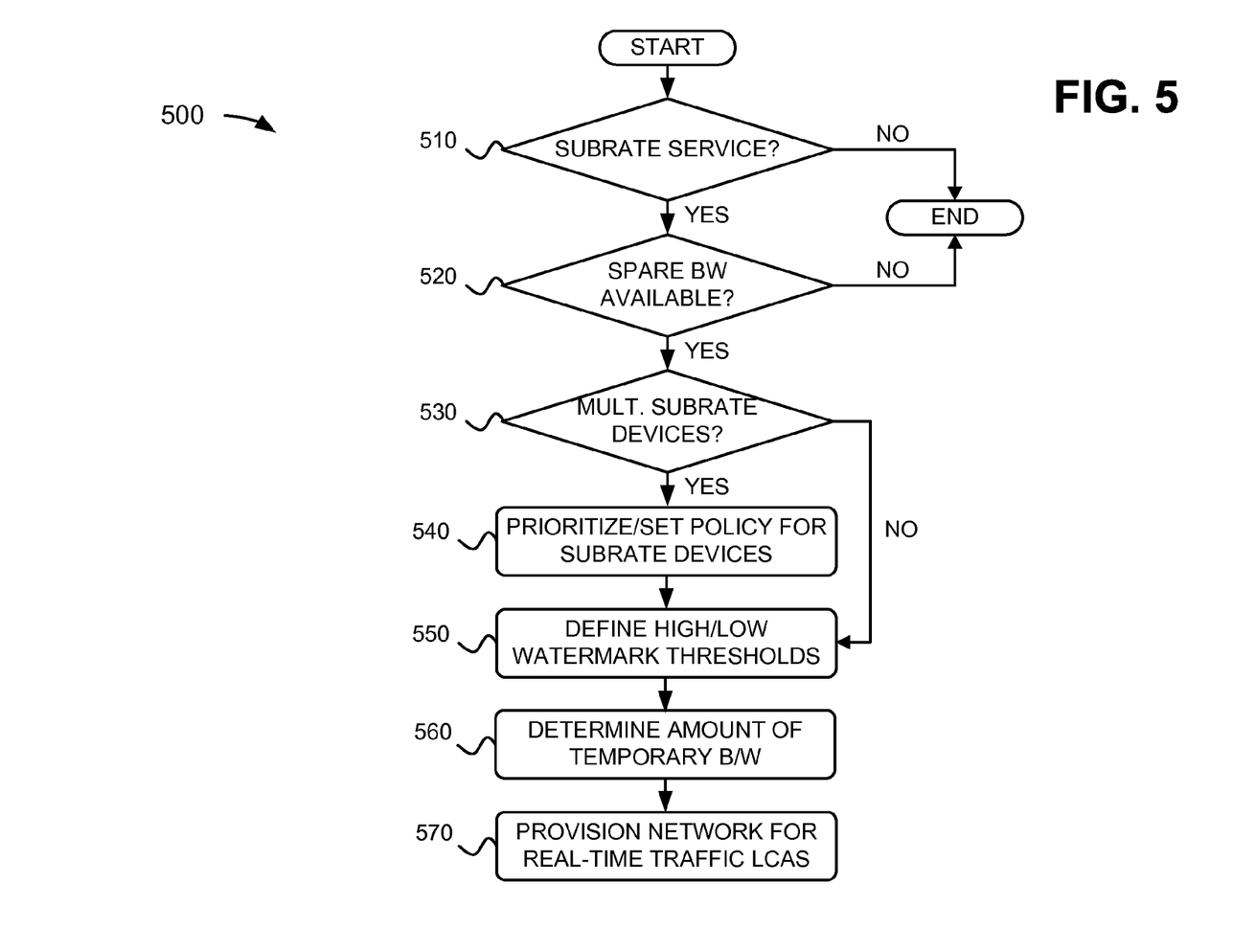
FIGS. 5 and 6 depict flowcharts of exemplary processes capable of being performed by the provider device shown in FIG. 3.
Figure 6:
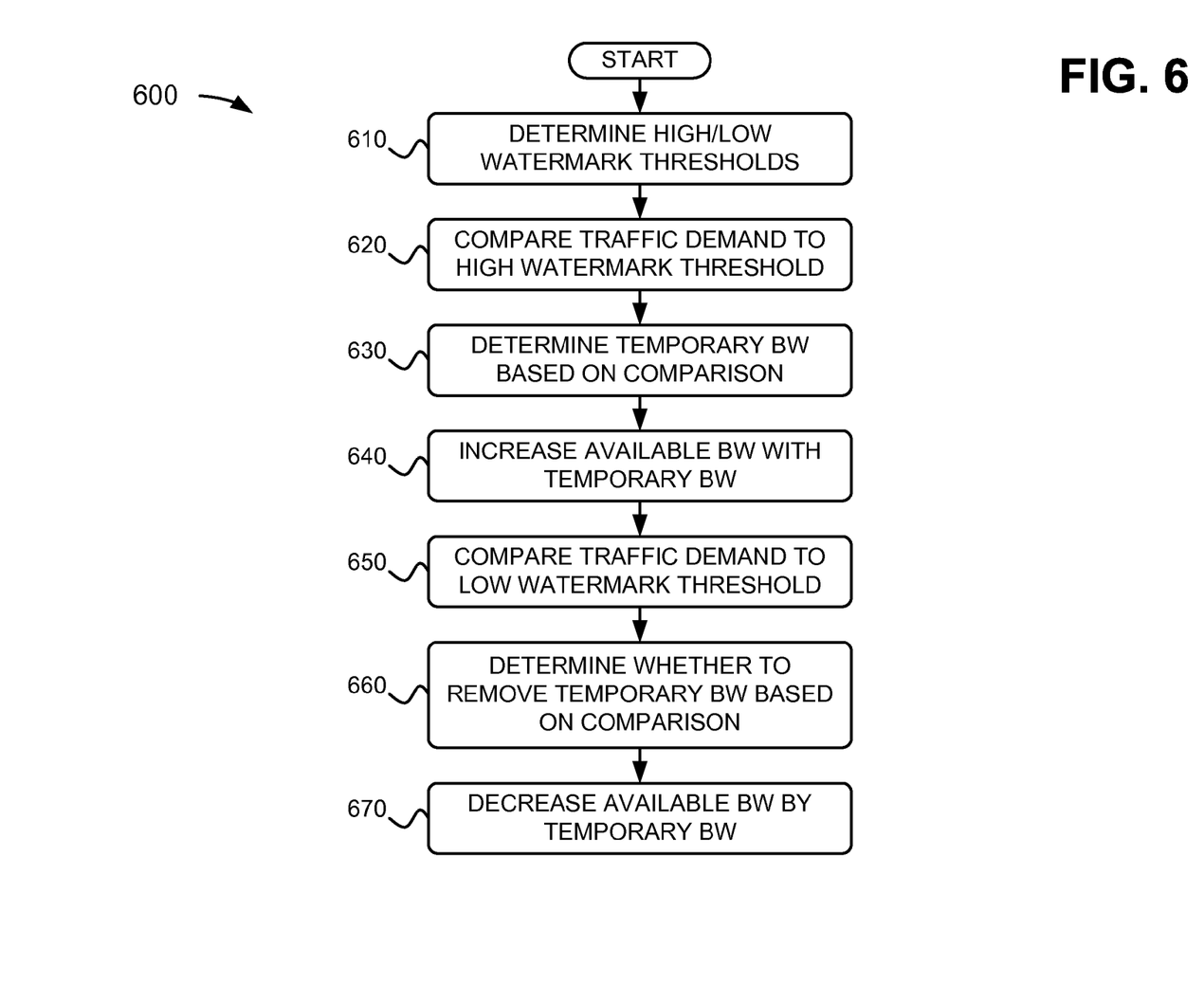

FIGS. 5 and 6 depict flowcharts of exemplary processes capable of being performed by provider device 110. The processes of FIGS. 5 and 6 may be performed by provider device 110 or may be performed by a device external to provider device 110 but communicating with provider device 110. The processes may be located within provider device 110 (e.g., within control unit 240) and/or may be accessible by provider device 110.

As shown in FIG. 5, a process 500 may determine if a subrate service exists (block 510). If a subrate service does not exist (block 510—NO), process 500 may end. For example, in one implementation, provider device 110 may determine if it is providing a subrate service to customer device 120. If provider device 110 is not providing a subrate service to customer device 120, the process may end.

If a subrate service exists (block 510—YES), process 500 may determine if spare bandwidth is available (block 520). If spare bandwidth is not available (block 520—NO), process 500 may end. For example, in one implementation, if provider device 110 is providing a subrate service but does not have spare bandwidth available to offer as temporary bandwidth, the process may end.

As further shown in FIG. 5, if spare bandwidth is available (block 520—YES), process 500 may determine whether multiple subrate devices exist (block 530). For example, in one implementation described above in connection with FIG. 3, provider device 110 may determine if multiple customer devices 120 are present for receiving multiple subrate services.

If multiple subrate devices exist (block 530—YES), process 500 may prioritize and/or set a policy for the subrate devices (block 540). For example, in one implementation described above in connection with FIG. 3, provider device 110 may prioritize and/or set a policy determining which of the multiple customer devices 120 may receive additional temporary bandwidth during traffic bursts. In one example, if two STS-1s are available as temporary bandwidth, a first customer device 120 may have priority over second and third customer devices 120. The first customer device 120 may have access to one additional STS-1, while the other customer devices 120 may not access this STS-1. However, the other customer devices 120 may share the remaining STS-1 on, for example, a first-come first-serve basis.

As further shown in FIG. 5, if multiple subrate devices do not exist (block 530—NO) or block 540 has been performed, process 500 may define a high watermark threshold and a low watermark threshold (block 550). For example, in one implementation described above in connection with FIG. 3, high/low watermark determiner 305 may permit input of one or more HWM thresholds 310 and one or more LWM thresholds 315 based on, e.g., a specific traffic rate or a percentage of an existing rate provided to customer device 120. High/low watermark determiner 305 may provide HWM threshold 310 and LWM threshold 315 to traffic/watermark comparer 320.

Process 500 may determine an amount of temporary bandwidth available for a traffic burst(s) (block 560). For example, in one implementation described above in connection with FIG. 3, traffic/watermark comparer 320 may receive traffic rate 300, HWM threshold 310, and LWM threshold 315, and may compare traffic rate 300 to HWM threshold 310 and LWM threshold 315. If traffic rate 300 is greater than or equal to HWM threshold 310, traffic/watermark comparer 320 may provide to LCAS adjuster 335 signal 325 indicating that HWM threshold 310 has been reached. If LCAS adjuster 335 receives signal 325, LCAS adjuster 335 may add temporary bandwidth 340 based on traffic rate 300 and the original subrate service bandwidth. If traffic rate 300 is less than or equal to LWM threshold 310, traffic/watermark comparer 320 may provide to LCAS adjuster 335 signal 330 indicating that LWM threshold 310 has been reached. If LCAS adjuster 335 receives signal 330, LCAS adjuster 335 may remove temporary bandwidth 345.

As further shown in FIG. 5, process 500 may provision a network for real-time traffic initiated LCAS (block 570). For example, in one implementation described above in connection with FIG. 3, bandwidth determiner 350 may receive either add temporary bandwidth 340 or remove temporary bandwidth 345 from LCAS adjuster 335, and may provide bandwidth 355 capable of accommodating traffic rate 300. If bandwidth determiner 350 receives add temporary bandwidth 340, bandwidth determiner 350 may provide bandwidth 355 that includes the original subrate service bandwidth and the temporary bandwidth. If bandwidth determiner 350 receives remove temporary bandwidth 345, bandwidth determiner 350 may provide bandwidth 355 that includes the original subrate service bandwidth.

As shown in FIG. 6, a process 600 may determine a high watermark threshold and low watermark threshold for traffic bandwidth (block 610). For example, in one implementation described above in connection with FIG. 3, high/low watermark determiner 305 may permit input of HWM threshold 310 and LWM threshold 315 based on, e.g., a specific traffic rate or a percentage of an existing rate provided to customer device 120. High/low watermark determiner 305 may provide HWM threshold 310 and LWM threshold 315 to traffic/watermark comparer 320.

Process 600 may compare a traffic demand to the high watermark threshold (block 620). For example, in one implementation described above in connection with FIG. 3, traffic/watermark comparer 320 may receive traffic rate 300 and HWM threshold 310, and may compare traffic rate 300 to HWM threshold 310. If traffic rate 300 is greater than or equal to HWM threshold 310, traffic/watermark comparer 320 may provide to LCAS adjuster 335 signal 325 indicating that HWM threshold 310 has been reached.

As further shown in FIG. 6, process 600 may determine a temporary bandwidth to provide based on the comparison (block 630). For example, in one implementation described above in connection with FIG. 3, LCAS adjuster 335 may receive traffic rate 300 and signal 325 from traffic/watermark determiner 320. If LCAS adjuster 335 receives signal 325 indicating that HWM threshold 310 has been reached, LCAS adjuster 335 may add temporary bandwidth 340 based on traffic rate 300 and the original subrate service bandwidth.

Process 600 may increase available bandwidth with the temporary bandwidth (block 640). For example, in one implementation described above in connection with FIG. 3, if bandwidth determiner 350 receives add temporary bandwidth 340, bandwidth determiner 350 may provide bandwidth 355 that includes the original subrate service bandwidth and the temporary bandwidth.

As further shown in FIG. 6, process 600 may compare a traffic demand to the low watermark threshold (block 650). For example, in one implementation described above in connection with FIG. 3, traffic/watermark comparer 320 may receive traffic rate and LWM threshold 315, and may compare traffic rate 300 to LWM threshold 315. If traffic rate 300 is less than or equal to LWM threshold 310, traffic/watermark comparer 320 may provide to LCAS adjuster 335 signal 330 indicating that LWM threshold 310 has been reached.

Process 600 may determine whether to remove the temporary bandwidth based on the comparison (block 660). For example, in one implementation described above in connection with FIG. 3, if LCAS adjuster 335 receives indication 330 that LWM threshold 315 has been reached, LCAS adjuster 335 may remove temporary bandwidth 345.

As further shown in FIG. 6, process 600 may decrease available bandwidth by removing the temporary bandwidth (block 670). For example, in one implementation described above in connection with FIG. 3, if bandwidth determiner 350 receives remove temporary bandwidth 345, bandwidth determiner 350 may provide bandwidth 355 that includes the original subrate service bandwidth.

Systems and methods described herein may enhance current LCAS features to provide a temporary increase in bandwidth based on real-time traffic demands. Using real-time traffic flows and predetermined watermark thresholds, additional temporary bandwidth may be added when a traffic burst is detected. If the traffic burst has passed, the temporary bandwidth may be removed. The systems and methods may apply the temporary bandwidth across multiple subrate services or devices, and may prioritize which subrate services or devices may receive additional bandwidth during traffic bursts.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 5 and 6, the order of the acts may differ in other implementations consistent with the embodiments described herein. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    establishing, by at least one network device, a priority policy to prioritize access, by each of a plurality of subrate devices, to a temporary bandwidth;
    defining, by the at least one network device, a high watermark threshold and a low watermark threshold associated with the plurality of subrate devices,
        the high watermark threshold being greater than the low watermark threshold,
        the plurality of subrate devices being associated with a subrate service that provides access to an original bandwidth available between a service provider and the plurality of subrate devices, and
        the high watermark threshold being below the original bandwidth;
    determining, by the at least one network device, the temporary bandwidth based on a first real-time traffic demand;
    determining, by the at least one network device, that the first real-time traffic demand exceeds the high watermark threshold;
    allocating, by the at least one network device and based on the priority policy and the first real-time traffic demand exceeding the high watermark threshold, the temporary bandwidth to the plurality of subrate devices,
        a first subrate device, of the plurality of subrate devices, being allocated a first portion of the temporary bandwidth that is greater than a second portion of the temporary bandwidth allocated to other subrate devices, of the plurality of subrate devices, based on a priority of the first subrate device being higher than a priority of the other subrate devices,
        the first portion of the temporary bandwidth being allocated to the first subrate device by providing the first subrate device access to a first synchronous transport signal, and
        the second portion of the temporary bandwidth being allocated to the other subrate devices by providing the other subrate devices a shared access to a second synchronous transport signal,
            the shared access being provided on a first-come first-serve basis;
    determining, by the at least one network device, that a second real-time traffic demand is less than or equal to the low watermark threshold; and
    removing, by the at least one network device, the temporary bandwidth from the plurality of subrate devices based on the second real-time traffic demand being less than or equal to the low watermark threshold.

2. The method of claim 1, further comprising:
    provisioning a network for a real-time traffic initiated link capacity adjustment scheme (LCAS) based on the temporary bandwidth.

3. The method of claim 1, where allocating the temporary bandwidth includes:
    adding the temporary bandwidth to the original bandwidth available to the plurality of subrate devices to provide an adjusted bandwidth based on the first real-time traffic demand exceeding the high watermark threshold.

4. The method of claim 1, where defining the high watermark threshold and the low watermark threshold includes at least one of:
    defining a predetermined traffic rate as the low watermark threshold; or
    defining a percentage of the original bandwidth available to at least one of the plurality of subrate devices as the low watermark threshold.

5. The method of claim 1, where defining the high watermark threshold and the low watermark threshold includes at least one of:
    defining a predetermined traffic rate as the high watermark threshold; or
    defining a percentage of the original bandwidth available to at least one of the plurality of subrate devices as the high watermark threshold.

6. The method of claim 1, where the subrate service comprises an Ethernet Private Line (EPL) service.

7. The method of claim 1, where the at least one network device comprises a synchronous optical network (SONET) multiplexer.

8. A device comprising:
    a memory; and
    a processor to:
        determine a high watermark threshold and a low watermark threshold for a plurality of user devices associated with a subrate service,
            the subrate service including access to an original bandwidth available between a service provider and the plurality of user devices,
            the high watermark threshold being below the original bandwidth, and
            the low watermark threshold being below the high watermark threshold,
        compare a first real-time traffic demand to the high watermark threshold and the low watermark threshold, determine that the first real-time traffic demand is greater than or equal to the high watermark threshold,
provide a temporary bandwidth to the plurality of user devices based on the first real-time traffic demand being greater than or equal to the high watermark threshold,
  a first user device, of the plurality of user devices, being allocated a first portion of the temporary bandwidth that is greater than a second portion of the temporary bandwidth allocated to a group of second user devices, of the plurality of user devices, based on a priority of the first user device being higher than a priority of the group of second user devices,
  the first portion of the temporary bandwidth being allocated to the first substrate device by providing the first user device access to a first synchronous transport signal, and
  the second portion of the temporary bandwidth being allocated to the group of second user devices by providing the group of second user devices a shared access to a second synchronous transport signal, the shared access being provided on a first-come first-serve basis;
determine that a second real-time traffic demand is less than or equal to the low watermark threshold, and
remove the temporary bandwidth from the plurality of user devices based on the second real-time traffic demand being less than or equal to the low watermark threshold.

9. The device of claim 8, where the subrate service comprises an Ethernet Private Line (EPL) service.

10. The device of claim 8, where the device comprises a synchronous optical network (SONET) multiplexer.

11. The device of claim 8, where the temporary bandwidth accommodates a bandwidth requirement associated with a traffic burst.

12. The device of claim 8, where the processor, when providing the temporary bandwidth, is to:
determine that the priority of the first user device is higher than the priority of the group of second user devices based on the first user device being associated with the data traffic center.

13. A non-transitory computer-readable medium for storing instructions, the instructions including:
one or more instructions that, when executed by a processor of a device, cause the processor to determine a high watermark threshold and a low watermark threshold for a plurality of user devices associated with a subrate service,
  the subrate service including access to an original bandwidth available between a service provider and the plurality of user devices, and
  the high watermark threshold is above the low watermark threshold and below the original bandwidth;
one or more instructions that, when executed by the processor, cause the processor to compare a first real-time traffic demand to the high watermark threshold to determine that the first real-time traffic demand is greater than or equal to the high watermark threshold;
one or more instructions that, when executed by the processor, cause the processor to allocate a temporary bandwidth to the plurality of user devices based on the first real-time traffic demand being greater than or equal to the high watermark threshold,
  a first user device, of the plurality of user devices, being allocated a first portion of the temporary bandwidth that is greater than a second portion of the temporary bandwidth allocated to a group of second user devices, of the plurality of user devices, based on a priority of the first user device being higher than a priority of the group of second user devices,
  the first portion of the temporary bandwidth being allocated to the first user device by providing the first user device access to a first synchronous transport signal, and
  the second portion of the temporary bandwidth being allocated to the group of second user devices by providing the group of second user devices a shared access to a second synchronous transport signal, the shared access being provided on a first-come first-serve basis;
one or more instructions that, when executed by the processor, cause the processor to compare a second real-time traffic demand to the low watermark threshold to determine that the second real-time traffic demand is less than or equal to the low watermark threshold; and
one or more instructions that, when executed by the processor, cause the processor to remove the temporary bandwidth from the plurality of user devices based on the second real-time traffic demand being less than or equal to the low watermark threshold.

14. The non-transitory computer-readable medium of claim 13, where the instructions further comprise:
one or more instructions to determine the temporary bandwidth based on comparing the first real-time traffic demand to the high watermark threshold.

15. The non-transitory computer-readable medium of claim 14, where a sum of the temporary bandwidth and the original bandwidth is greater than or equal to the first real-time traffic demand.

16. The non-transitory computer-readable medium of claim 13, where the one or more instructions to determine the high watermark threshold and the low watermark threshold include:
one or more instructions to determine the high watermark threshold as one of a predetermined traffic rate or a percentage of the original bandwidth available to the subrate service.

17. The non-transitory computer-readable medium of claim 13, where the instructions further comprise:
one or more instructions to determine that a traffic burst is ending based on comparing the second real-time traffic demand to the low watermark threshold; and
where the one or more instructions to remove the temporary bandwidth include:
  one or more instructions to remove the temporary bandwidth based on the traffic burst ending.

18. The non-transitory computer-readable medium of claim 13, where the one or more instructions to determine the high watermark threshold and the low watermark threshold include:
one or more instructions to determine the low watermark threshold based on at least one of:
  a predetermined traffic rate, or
  a percentage of the original bandwidth available to the subrate service.

19. The non-transitory computer-readable medium of claim 13, where the subrate service comprises an Ethernet Private Line (EPL) service, and
where the device implementing the instructions comprises a synchronous optical network (SONET) multiplexer.

20. The non-transitory computer-readable medium of claim 13, where the instructions further comprise:

one or more instructions to provision a network for a real-time traffic initiated link capacity adjustment scheme (LCAS) based on the temporary bandwidth.

\* \* \* \* \*